United States Patent
Rademan et al.

(10) Patent No.: US 9,815,738 B2
(45) Date of Patent: Nov. 14, 2017

(54) MAGNESIUM PHOSPHATE CEMENT

(71) Applicant: Premier Magnesia, LLC, West Conshohocken, PA (US)

(72) Inventors: Jerry E. Rademan, Jacksonville, FL (US); Claudio Manissero, Huntersville, NC (US); John K. Gehret, Miami Beach, FL (US); Mark A. Shand, Arden, NC (US); James Preskenis, Dover, DE (US)

(73) Assignee: Premier Magnesia, LLC, Wayne, PA (US)

( * ) Notice: Subject to any disclaimer, the term of this patent is extended or adjusted under 35 U.S.C. 154(b) by 0 days.

(21) Appl. No.: 13/904,296

(22) Filed: May 29, 2013

(65) Prior Publication Data

US 2014/0096704 A1 Apr. 10, 2014

Related U.S. Application Data

(60) Provisional application No. 61/711,549, filed on Oct. 9, 2012.

(51) Int. Cl.
| | | |
|---|---|---|
| *C04B 12/02* | (2006.01) | |
| *C04B 9/04* | (2006.01) | |
| *C04B 2/10* | (2006.01) | |
| *C04B 14/30* | (2006.01) | |
| *C04B 28/34* | (2006.01) | |

(52) U.S. Cl.
CPC ............ *C04B 12/025* (2013.01); *C04B 2/102* (2013.01); *C04B 14/304* (2013.01); *C04B 28/34* (2013.01)

(58) Field of Classification Search
CPC ................. C04B 12/025; C04B 9/04
See application file for complete search history.

(56) References Cited

U.S. PATENT DOCUMENTS

| | | | | |
|---|---|---|---|---|
| 3,821,006 | A | * 6/1974 | Schwartz | ............... C04B 9/04 106/691 |
| 3,960,580 | A | 6/1976 | Stierli et al. | |
| 4,174,227 | A | 11/1979 | Tomic | |
| 4,302,251 | A | * 11/1981 | Udagawa | |
| 4,394,174 | A | * 7/1983 | Tomic | |

(Continued)

FOREIGN PATENT DOCUMENTS

| | | |
|---|---|---|
| GB | 1391074 | 4/1975 |
| WO | 9713815 | 4/1997 |

OTHER PUBLICATIONS

International Search Report and Written Opinion for International Application No. PCT/US2013/059713 mailed Jan. 24, 2014.

(Continued)

*Primary Examiner* — Paul Marcantoni
(74) *Attorney, Agent, or Firm* — Jeffrey T. Placker; Holland & Knight LLP

(57) ABSTRACT

Magnesium phosphate cement binder systems and method for providing magnesium phosphate cements are described. In an embodiment, a magnesium phosphate cement binder system may include magnesium oxide that has been calcined at a temperature of between about 900° F. to about 1800° F. The magnesium phosphate cement binder system may also include a phosphate material. Other formulations, compositions, and methods are also described.

13 Claims, 1 Drawing Sheet

(56) References Cited

U.S. PATENT DOCUMENTS

| | | | |
|---|---|---|---|
| 4,734,133 A * | 3/1988 | Sherif | C04B 28/342 106/690 |
| 4,756,762 A * | 7/1988 | Weill | C04B 24/003 106/691 |
| 4,786,328 A * | 11/1988 | Weill | C04B 28/34 106/691 |
| 4,931,097 A | 6/1990 | Band | |
| 5,002,610 A * | 3/1991 | Sherif | C04B 12/02 106/690 |
| 5,049,198 A | 9/1991 | Ribas | |
| 5,121,795 A * | 6/1992 | Ewert | |
| 5,232,496 A | 8/1993 | Jennings et al. | |
| 6,458,423 B1 | 10/2002 | Goodson | |
| 6,783,799 B1 | 8/2004 | Goodson | |
| 7,304,104 B2 | 12/2007 | Yamashita | |
| 7,435,766 B2 | 10/2008 | Ong | |
| 7,438,755 B2 * | 10/2008 | Wagh | C04B 28/34 106/690 |
| 7,491,267 B2 | 2/2009 | Francis et al. | |
| 7,744,693 B2 | 6/2010 | Mabey | |
| 7,922,808 B2 | 4/2011 | Brower et al. | |
| 8,603,237 B2 | 12/2013 | Rademan et al. | |
| 8,663,382 B2 | 3/2014 | Dubey | |
| 2004/0056378 A1 * | 3/2004 | Bredt | |
| 2005/0274285 A1 * | 12/2005 | Christensen | |
| 2006/0048682 A1 * | 3/2006 | Wagh | C04B 28/34 106/638 |
| 2007/0266905 A1 | 11/2007 | Amey et al. | |

OTHER PUBLICATIONS

International Preliminary Report on Patentability issued on Apr. 23, 2015 in corresponding International Application No. PCT/US2013/059713.
Official Note No. 340 issued in the counterpart International Panama Application No. 90634 on Sep. 7, 2015 by the Industrial Property Department.
Patent Examination Report No. 1 issued in related Australian Application No. 2013330338 on Dec. 18, 2015.
Hall, D.A., et al., "The effect if retarder on the microstructure and mechanical properties of magnesia-phosphate cement mortar".
Extended European Supplementary Search Report issued on May 2, 2016 in counterpart European Application No. 13 84 5620.
International Search Report and Written Opinion for International Application No. PCT/US2017/013180 dated Feb. 16, 2017.
Communication pursuant to Article 94(3) EPC issued on Mar. 23, 2017 in counterpart European Application No. 13845620.7.
Final Office Action issued on Dec. 20, 2016 in U.S. Appl. No. 14/993,520.
Examination Report No. 1 issued in counterpart Australian Application Serial No. 2017202407 on Aug. 31, 2017.
Examination Report No. 2 issued in counterpart Australian Application Serial No. 2017202407 on Sep. 1, 2017.

* cited by examiner

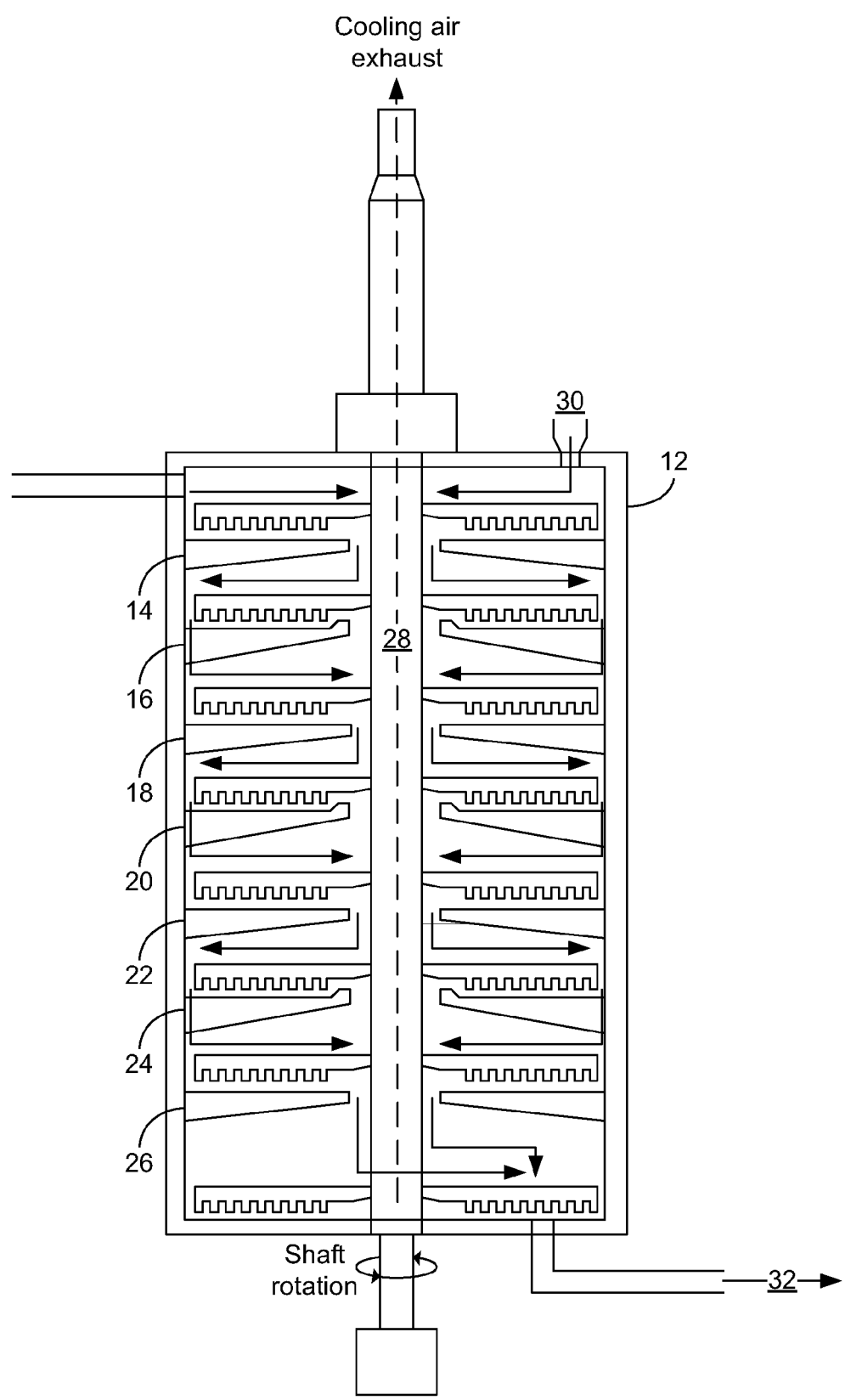

MAGNESIUM PHOSPHATE CEMENT

CROSS-REFERENCE TO RELATED APPLICATIONS

This application claims the benefit of U.S. provisional patent application Ser. No. 61/711,549, entitled "Novel Magnesium Phosphate Cement Compositions and Applications," filed on 9 Oct. 2012, the entire disclosure of which is incorporated herein by reference.

TECHNICAL FIELD

The present disclosure generally relates to magnesium phosphate cement.

BACKGROUND

Various cement binder systems are commonly used in construction and manufacturing. Magnesium phosphate cement is a variety of cement that often exhibits relatively high compressive strengths and extremely fast setting times. Not only may many magnesium phosphate cements provide a relatively high ultimate compressive strength, but many magnesium phosphate cements may also develop relatively early high compressive strengths, which may provide advantageous structural characteristics that may be utilized within a short time after forming. While magnesium phosphate cements may exhibit very fast set times, set times associated with magnesium phosphate cements can often be unpredictable, with the set times varying from batch to batch. Such variation and unpredictability can make working with magnesium phosphate cements challenging, and can greatly complicate planning and managing projects that utilize magnesium phosphate cements.

In addition to the very fast setting times, magnesium phosphate cements may often experience relatively high setting reaction temperatures. For example, the curing reactions associated with magnesium phosphate cements can, in some situations, result in peak cement temperatures as high as 200° F., or greater, during curing of the cement. Some formulations of magnesium phosphate cements may also result in the evolution of hazardous and/or undesirable fumes, gasses, or odors. For example, some magnesium phosphate cement formulations may utilize di-ammonium phosphate, which may give rise to the evolution of ammonia gas. In some situations, the relative high cure reaction temperatures, odors or fumes, as well as the potentially unpredictable setting times, may result in difficult field work conditions

SUMMARY

According to an implementation, a magnesium phosphate cement binder system may be provided. The magnesium phosphate cement binder system may include magnesium oxide calcined at a temperature of between about 900° F. to about 1800° F. The magnesium phosphate cement binder system may also include a phosphate material.

One or more of the following features may be included. The magnesium oxide may be calcined using a multiple hearth furnace. The multiple hearth furnace may include a Herreshoff-type multiple hearth furnace. The magnesium oxide may include a surface area in the range of between about 10 m$^2$/g to about 120 m$^2$/g.

The magnesium oxide and the phosphate material may be provided having a magnesium oxide to phosphate material weight ratio of between about 1:5 to about 5:1. The phosphate material may include one or more of an organic phosphate salt and an inorganic phosphate salt. In some embodiments, the phosphate material may include one or more of a dihydrogen phosphate, a phosphonate, polyphosphate, pyrophosphate, a phosphoric acid, and an orthophosphate.

The magnesium oxide may include a surface treatment configured to increase the time for the binder system to reach a maximum heat of hydration in response to hydrating the binder system. The surface treatment may include one or more of a hydrocarbon oil, a hydrocarbon wax, an organic glycol, a surfactant, a siliconized oil, a siliconized wax, a siliconized glycol, a fluorinated fluid, a monomer, an oligomer, a polymer, a reactive silane coupling agent, a fatty acid, a fatty acid ester, a polysaccharide, a long chain alkyl silicone monomer, a time releasing water soluble polymer, a time releasing water soluble oligomer, a gelatin, an acetate, and a borate.

The magnesium phosphate cement binder system may further include a cure retardant. The cure retardant may include one or more of zinc oxide, lithium citrate, lithium acetate, lignosulfonates, zeolites, polysaccharides, amino acids, tetraborates, and organic acid salts. The magnesium phosphate cement binder system may further include a powdered carbonate.

According to another implementation, a method may include providing magnesium oxide calcined at a temperature of between about 900° F. to about 1800° F. The method may also include providing a phosphate material. The method may also include combining the magnesium oxide and the phosphate material. The method may further include hydrating the combined magnesium oxide and phosphate material.

One or more of the following features may be included. The magnesium oxide may be calcined using a multiple hearth furnace. The magnesium oxide may include a surface area in the range of between about 10 m$^2$/g to about 120 m$^2$/g.

Combining the magnesium oxide and the phosphate material may include combining the magnesium oxide in a weight ratio to the phosphate material of between about 1:5 to about 5:1. Hydrating the combined magnesium oxide and phosphate material may include hydrating with chilled hydration water having a temperature between about 33° F. to about 70° F. The method may further include carbonating hydration water used to hydrate the combined magnesium and phosphate material. The method may further include combining the magnesium oxide and phosphate material with a powdered carbonate.

Providing the magnesium oxide may include treating a surface of the magnesium oxide to increase the time for the binder system to reach a maximum heat of hydration in response to hydrating the combined magnesium oxide and phosphate material. Providing the magnesium oxide may include reacting the magnesium oxide with sulfuric acid to increase surface reactivity of the magnesium oxide.

The method may further include combining the magnesium oxide and the phosphate material with a cure retardant including one or more of zinc oxide, lithium citrate, lithium acetate, lignosulfonates, zeolites, polysaccharides, amino acids, tetraborates, and organic acid salts. The phosphate material may include one or more of an organic phosphate salt and an inorganic phosphate salt.

The details of one or more implementations are set forth in the accompanying drawings and the description below.

Other features and advantages will become apparent from the description, the drawings, and the claims.

BRIEF DESCRIPTION OF THE DRAWINGS

FIG. 1 diagrammatically depicts a multi-hearth furnace that may be implemented for calcining magnesium oxide, according to an embodiment of the present disclosure.

DETAILED DESCRIPTION OF EXAMPLE EMBODIMENTS

According to an embodiment, a magnesium phosphate cement binder system may be provided. The magnesium phosphate cement binder system may include magnesium oxide calcined at a temperature of between about 900° F. to about 1800° F. The magnesium phosphate cement binder system may also include a phosphate material. In an example use embodiment, the magnesium oxide and the phosphate material may be combined with one another, and may be hydrated, thereby initiating a curing reaction between the magnesium oxide and the phosphate material. In some embodiments, hydrating the combined magnesium oxide and the phosphate material may include combining the magnesium oxide and the phosphate materials as dry powders and subsequently hydrating the combined with water. In some embodiments, the magnesium oxide may be provided as a dry power which may be combined with an aqueous mixture including the phosphate material. In such an embodiment, mixing the magnesium oxide and the phosphate material and hydrating the combined magnesium oxide and phosphate material may generally occur in a single mixing operation.

As generally described above, magnesium oxide utilized in the context of the present disclosure may include magnesium oxide calcined at a temperature of between about 900° F. to about 1800° F. (hereinafter, generally referred to low temperature calcined magnesium oxide). Magnesium oxide calcined at such temperature ranges may result in a magnesium oxide material that have a relatively lower manufacturing cost as compared to magnesium oxide materials that have previously been used in connection with magnesium phosphate cements (e.g., which may generally be calcined at a relatively higher temperature). Further, low temperature calcined magnesium oxide materials may generally have a relatively higher reactivity than magnesium oxide materials that have previously been used in connection with magnesium phosphate cements. In some embodiments magnesium oxide calcined at a temperature between about 900° F. to about 1800° F. may exhibit particular morphologies and/or characteristics. For example, in an illustrative embodiment, magnesium oxide calcined at a temperature of between about 900° F. to about 1800° F. may include a surface area in the range of between about 10 m$^2$/g to about 120 m$^2$/g, as determined using Brunauer-Emmett-Teller surface area measurement methodology. In further example embodiments, magnesium oxide calcined at a temperature of between about 900° F. to about 1800° F. may have a surface area between about 10 m$^2$/g to about 35 m$^2$/g. Low temperature calcined magnesium oxide having such example surface areas may be employed for magnesium phosphate cement binder systems consistent with the present disclosure.

Contrary to previous concerns that relatively lower reactivity magnesium oxide materials would be necessary for use in magnesium phosphate cements to limit the already extremely fast reactions times, consistent with embodiments of the present disclosure, relatively highly reactive magnesium oxide materials calcined at temperatures of between about 900° F. to about 1800° F. may be utilized to provide magnesium phosphate cement binder systems that may exhibit a greater degree of consistency, reproducibility, and/or controllable set time than may have generally be achieved for magnesium phosphate cements. For example, magnesium oxide materials previously utilized for magnesium phosphate cements may generally be of the "hard burned" or "dead burned" grades. Such grades of magnesium oxide may generally be calcined at temperatures of between about 2300° F. to about 3200° F. Calcining at such temperatures may generally result in a relatively lower reactivity of the surface of the magnesium oxide. Such relatively lower reactivity may have often been utilized in an attempt to increase the reaction or set time of magnesium phosphate cements to provide sufficient working time for the cement.

In some embodiments, low temperature calcined magnesium oxide materials may generally have a relatively higher reactivity than magnesium oxide materials that have previously been used in connection with magnesium phosphate cements. In some embodiments magnesium oxide calcined at a temperature between about 900° F. to about 1800° F. may exhibit particular reactivities. In an example embodiment, a low temperature calcined magnesium oxide material calcined at a temperature of between about 900° F. to about 1800° F. may exhibit a caustic magnesia activity neutralization time of between about nine seconds to about 30 seconds using a 1.0N acetic acid and a magnesium oxide content of between about 10% to about 100%. In some embodiments, a low temperature calcined magnesium oxide calcined at a temperature of between about 900° F. to about 1800° F. may exhibit an oxysulfate set time of between about four minutes to about eight minutes using a 30% Epsom Salt solution and a timing temperature rise of between about 110° F. to about 180° F.

In some embodiments, the magnesium oxide may be calcined at a temperature of between about 900° F. to about 1800° F. using a multiple hearth furnace. In some embodiments, the magnesium oxide may be produced from highly reactive caustic calcined magnesia that are burned from magnesium bearing ores such as magnesite. For example, as generally discussed above, the magnesium oxide may be calcined to achieve particular desired reactivity and/or surface characteristics (e.g., surface area, etc.). In some instances the type of furnace or kiln used in the calcining process may allow such desired reactivity and/or surface characteristics to be achieved. In some embodiments, a multiple hearth furnace may advantageously be employed for calcining the magnesium oxide to achieve the desired reactivity and/or surface characteristics. One particular example of a multiple hearth furnace may include a Herreshoff-type kiln, or furnace. Referring to FIG. 1, multiple hearth furnace 10 may generally include, in an example embodiment, vertical cylindrical furnace 12 that may enclose a plurality of generally circular hearths (e.g., hearths 14, 16, 18, 20, 22, 24, 26). While the illustrated furnace is only shown including seven hearths, this is intended for illustrative purposes only. For example, a multiple hearth furnace may include 10 to 14 (or more) hearths firing in a temperature range of between about 1500° F. to about 1900° F. In some configurations, a multiple hearth furnace may include generally central shaft 28 that may drive cool air through each of the plurality of hearths as the calcined material works its way down the furnace from feed 30 to product 32. The cool air driven through each of the hearths may ensure that a very controlled temperature is achieved throughout the entire calcinations process. Such a controlled calcinations process may result in surface characteristics that are evenly and consistently developed throughout the calcined magnesium oxide. The evenly and consistently developed surface characteristics may allow of a uniformly reactive grade of magnesium oxide. It should be appreciated that the number of hearths and the firing temperature ranges are intended for the purpose of illustration and not of limitation as other numbers of hearths and firing temperature ranged may suitably be employed.

In some embodiments various different phosphates and/or phosphate sources may be utilized to achieve different reaction times with the magnesium oxide. Selection of particular phosphates and/or phosphate sources may allow set times of the resultant magnesium phosphate cement binder system to be controlled, e.g., for suitability for different applications or uses. While magnesium phosphate cement binder systems utilizing low temperature calcined magnesium oxide may suitably be employed with conventional phosphate salts (such as potassium, ammonium, and aluminum phosphate salts), the particular character of the low temperature calcined magnesium oxide of the present disclosure may be suitably employed with various other phosphorous sources to favorable effect. For example, the phosphate material may include one or more of an organic phosphate salt and an inorganic phosphate salt. In some embodiments, the phosphate material may include one or more of a dihydrogen phosphate, a phosphonate (e.g., potassium, ammonium, and/or aluminum anologues of phosphonates, polyphosphates and/or pyrophosphates). Further, in some embodiments, various molar concentrations of a phosphoric acid, and/or an orthophosphate may be utilized. Still further, in some embodiments, lower purity grades of inorganic phosphates (e.g., including varieties that may be typically utilized in the fertilizer industry) may be utilized. Such additional/alternative phosphate materials may generally provide a relatively low cost alternative phosphate materials for use in magnesium phosphate cement binder systems.

In some embodiments, the relatively high reactivity of the low temperature calcined magnesium oxide may allow relatively lower mix ratios of magnesium oxide to phosphate material. In some situations, the relatively lower mix ratio may result in improved properties of a magnesium phosphate cement produced using a formulation consistent with the present disclosure. In some embodiments, such improved properties may further be achieved at a relatively reduced cost (e.g., as compared to conventional magnesium phosphate cement). For example, depending upon the mix ratio and the exact phosphate material utilized, it may be possible to achieve great various in early compressive strength of a resultant magnesium phosphate cement, as well as in the ultimate compressive strength of a resultant magnesium phosphate cement. Such variability in early, and ultimate, compressive strength may allow magnesium phosphate cement binder systems to be developed in a manner optimized for a particular use or application. In some embodiments, the magnesium oxide and the phosphate material may be provided having a magnesium oxide to phosphate material weight ratio of between about 1:5 to about 5:1, as well as any mix ratio in between. In some embodiments, the combined low temperature calcined magnesium oxide and phosphate material may be hydrated to initiate the curing reaction. The combined low temperature calcined magnesium oxide and phosphate material may be hydrated with water used in quantities of between about 15% to about 40% of the total weight of the combined low temperature calcined magnesium oxide and phosphate material.

In one particular example, a 1:1 ratio of magnesium oxide to phosphate material (e.g., mono-Potassium Phosphate in the particular example) is shown in Table 1 below. Consistent with the example formulation, the combined magnesium oxide and phosphate material were hydrated by adding 29% water, relative to the entire weight of the magnesium phosphate cement binder system including the magnesium oxide, phosphate material and other components (e.g., fly ash and boric acid in the example formulation).

TABLE 1

Example of MgO:Phosphate mix ratio

| Raw Material: | % of Formula by Weight: |
| --- | --- |
| MgO (93HR from Premier Magnesia) | 28 |
| MKP (mono-Potassium Phosphate from ICL) | 28 |
| Fly Ash (Class F from Headwaters) | 39 |
| Boric Acid | 5 |

In some situations, it may be desirable to control and/or to reduce the reaction rate, and thereby the cure time, of a magnesium phosphate cement composition. In an embodiment, the relatively high reactivity surface of the low temperature calcined magnesium oxide may be treated to increase the time for the magnesium phosphate cement binder system to reach a maximum heat of hydration in response to hydrating the binder system. Increasing the time for the magnesium phosphate cement binder system to reach a maximum heat of hydration may controllably slow down the initial reaction time, which may, in some embodiments, allow for a longer set time. As will be appreciated, a longer set time may increase the amount of time that a user of the magnesium phosphate cement binder system may have for placing, forming, etc., the cement system.

In an embodiment, treating the surface of the magnesium oxide may include treating the surface of the magnesium oxide prior to combining the magnesium oxide with the phosphate material. In various example embodiments the surface treatment may include one or more of a hydrocarbon oil, a hydrocarbon wax, an organic glycol, a surfactant (e.g., one or more of a nonionic, anionic, ationic and/or amphoteric surfactant), a siliconized oil, a siliconized wax, a siliconized glycol, a fluorinated fluid, a fluorinated monomer, a fluorinated oligomer, a fluorinated polymer, a reactive silane coupling agent, a fatty acid, a fatty acid ester, a polysaccharide, a long chain alkyl silicone monomer, a time releasing water soluble polymer, a time releasing water soluble oligomer, a gelatin, an acetate, and/or a borate. In some embodiments, the surface treatment may adsorb on the surface of the magnesium oxide particles. In some embodiments, the surface coating, or surface treating may dissolve and/or burn off as a result of hydration heat arising from the magnesium oxide/phosphate material reaction when the magnesium phosphate cement binder system is hydrated. The dissolving and/or burning off of the surface treatment may, in some embodiments, allow the ultimate hydration temperature to be reached (e.g., and allowing full strength development of the magnesium phosphate cement) while allowing longer working times (e.g., by delaying the reaction).

In one particular example, set times associated with magnesium phosphate cement binder systems may be increased by coating the magnesium oxide with borates prior to reaction with the phosphate materials. In one particular example, boric acid may be dissolved in ethanol. The magnesium oxide may be treated with the solution of boric acid dissolved in ethanol. The ethanol may evaporate (e.g., without unduly hydrating the magnesium oxide), thereby pre-treating the surface of the magnesium oxide with boric acid. Some examples of surface coating materials are detailed below in Table 2.

TABLE 2

Examples of Surface coating materials on MgO to slow Set-Times of MPC Formulations

| Surface Coating Material: | % of MgO by Weight: |
|---|---|
| Stearic Acid | 7 |
| Ethylene Glycol | 10 |
| n-Octyltriethoxy Silane | 2 |
| Perfluoropolyether Fluid | 0.1 |

In some embodiments, the initial heat of hydration of the magnesium phosphate cement binder system may be lowered through the use of chilled water used for hydrating the magnesium phosphate cement binder system. In some embodiments, the chilled hydration water may lower the initial heat of hydration of the magnesium phosphate cement binder system when hydrated with the chilled water, while still allowing the magnesium oxide to react with the phosphate material, and allowing hydration reaction temperatures to reach about 150° F., or higher. For example, in some embodiments, optimum strength gains may be achieved when the magnesium phosphate cement binder system is allowed to achieve an internal temperature of 150° F. or greater. Allowing hydration reaction temperatures to reach about 150° F., or higher, may allow ultimate compressive strengths in the range of about 8000 psi, or greater, to be achieved in the resultant magnesium phosphate cement. In some embodiments, the ultimate compressive strength of the resultant magnesium phosphate cement may be based on, at least in part, fillers that may be used in the magnesium phosphate cement formulation. For example, hydrating the combined magnesium oxide and phosphate material may include hydrating with chilled hydration water having a temperature between about 33° F. to about 70° F. In some embodiments, the hydration water may be chilled to near freezing. The use of chilled hydration water may be used alone and/or in combination with magnesium oxide surface treatments and/or cure retarding additives, such as boric acid and/or other cure retarding additives as discussed below.

As generally mentioned above, in addition/as an alternative to surface treatments of the magnesium oxide and/or the use of chilled hydration water, a magnesium phosphate cement binder system may include various cure retarding agents, e.g., which may increase the cure time of the resultant magnesium phosphate cement, and thereby increase the working time associated with the magnesium phosphate cement. Examples of cure retardants that may be separately combined with the magnesium oxide, with the phosphate material, and/or the combined magnesium oxide and phosphate material mixture may include one or more of boric acid, borax, zinc oxide, lithium citrate, lithium acetate, lignosulfonates, zeolites, polysaccharides, amino acids, tetraborates (e.g., borax, magnesium tetraborate, etc.), metaborates, and/or organic acid salts. In some embodiments, such cure retardants and/or combinations of cure retardants may increase the set time of the resultant magnesium phosphate cement and may, in some embodiments, improved ultimate cure strength properties of the magnesium phosphate cement. In some embodiments, various cure retardants be effective used alone, and/or in combination with boric acid or borax. An example of a magnesium phosphate cement binder system include one or more cure retardants is detailed below in Table 3.

TABLE 3

An example of new Cure Retardants for MPC Formulations

| Raw Material: | % of Formula by Weight: |
|---|---|
| MgO (93HR from Premier Magnesia, LLC) | 15 |
| Mono-Potassium Phosphate (MKP from ICL) | 30 |
| Metakaolin | 25 |
| Sand | 22 |
| Amino Acid (Retardan from Sika Corp.) | 4 |
| Boric Acid | 4 |

In some embodiments, various additives and/or techniques may be implemented to improve and/or alter characteristics of magnesium phosphate cements consistent with the present disclosure. For example, in some embodiments characteristics such as ultraviolet light stability and water resistance of magnesium phosphate cement, particularly at an early age, may be improved through pre-carbonation of the magnesium phosphate cement binder system (e.g., carbonation prior to setting of the magnesium phosphate cement). According to various embodiments, pre-carbonation of the magnesium phosphate cement binder system may be implemented by the inclusion of various carbonate materials in the magnesium phosphate cement binder system. Examples of powdered carbonate materials that may be added to the magnesium phosphate cement binder system may include carbonates and/or bicarbonates, such as, sodium carbonate, sodium bicarbonate, sodium percarbonate, sodium sesquicarbonate and/or other carbonate materials.

In some embodiments, pre-carbonation of the magnesium phosphate cement binder system may include carbonating hydration water used to hydrate the combined magnesium and phosphate material. For example, carbonated water may be used as the hydration water for activating the magnesium phosphate cement binder system. In an embodiment, the hydration water may be carbonated by bubbling carbon dioxide into the hydration water. Upon mixing the carbonated hydration water with the magnesium phosphate cement binder system, the magnesium phosphate cement mix may become carbonated during the curing phase. In a related embodiment, the magnesium phosphate cement mix (i.e., the hydrated magnesium phosphate cement binder system which has not yet cured) may be carbonated by adding dry ice to the magnesium phosphate cement mix and/or by feeding pressurized carbon dioxide into the magnesium phosphate cement mix (e.g., which may in some embodiments be achieved along with pressurized feeding of proteinaceous surfactants, or aeration agents like Merlcrete into the magnesium phosphate cement mix). In some embodiments, the user of dry ice and/or pressurized feeding of carbon dioxide into the magnesium phosphate cement mix may also result in a lighter weight cured magnesium phosphate cement. Table 4 below details an example magnesium phosphate cement binder system including a carbonate material.

TABLE 4

Example of formula to provide early carbonation to MPC matrices

| Raw Material: | % of Formula by Weight (before adding water): |
|---|---|
| MgO (93HR from Premier Magnesia) | 30 |
| MKP (mono-Potassium Phosphate from ICL) | 20 |
| Recycled Glass (Vcas from Vitro Minerals) | 25 |
| Silica Sand (dried) | 17 |
| Sodium Bicarbonate | 3 |
| Boric Acid | 5 |

According to various embodiments, a wide range of fillers, aggregates and/or pozzolans may be used with the magnesium phosphate cement binder system of the present disclosure. In some embodiments, various fillers, aggregates and/or pozzolans may be utilized to achieve a more controllable and/or reproducible set times for the magnesium phosphate cement. Such more controllable and/or reproducible set times may range from very fast (e.g., which may be suitable for applications such as dry shotcrete and patching mixes for concrete bridge repair) to relatively slow set times (e.g., which may be desirable for poured-in-place concrete slab applications, or the like). In some embodiments, the fillers, aggregates and/or pozzolans may effect strength development and heat of hydration crosslinking of the magnesium phosphate cement. Examples of fillers, aggregates and/or pozzolans may include, but are not restricted to fly ashes of any grade or composition, Metakaolin, ground granulated blast furnace slag (GGBFS), silica fume or fumed silica, Wollastonite, zeolites, ground recycled glass (both low and high alkali), and very dry (low to zero water content) silica sand. Various additional/alternative materials may also be utilized.

Providing the magnesium oxide may include reacting the magnesium oxide with sulfuric acid to increase surface reactivity of the magnesium oxide. For example, in some embodiments, the low temperature calcined magnesium oxide may be reacted with sulfuric acid to provide increased surface reactivity, which may improve the strength of the resultant magnesium phosphate cement.

Various features and/or aspects of magnesium phosphate cements utilizing magnesium oxide calcined at temperatures between about 900° F. to about 1800° F. have been demonstrated experimentally, as detailed below in Experimental Examples 1 and 2.

Experimental Example 1 of Slowing Set-times of Mg Phosphate Cements

In a first experimental example a magnesium phosphate cement binder system was formulated including:

25% by weight metakaolin powder,
15% by weight of MgO calcined in a Multiple Hearth Furnace (MHF) at a temperature between about 900° F. and about 1800° F.,
30% by weight monopotassium phosphate powder,
26% sand, and
4% boric acid.

The ingredients were combined to form a powder blend. Water was added to the powder blend in a weight ratio of 1:4 water to powder blend, and stirred for 2 minutes at room temperature to form slurry. The slurry was then poured into 2 inch plastic cube molds and left to cure. The slurry was observed to set into a hard ceramic within ~24 minutes. The resulting chemically bonded phospho-silicate ceramic was observed as dense, non-porous and homogenous. Compression strengths were found to increase from 1956 psi in 3 hours to 4605 psi in 21 days.

Experiment Example 2 of Slowing Set-times of Mg Phosphate Cements

In a second experiment example a magnesium phosphate cement binder system was formulated including:

10% by weight of a similar magnesium oxide powder as used in Experimental Example 1,
30% by weight monopotassium phosphate powder,
30% by weight metakaolin powder,
28% sand, and
2% boric acid.

The ingredients were mixed to form a powder blend. Water was added to the powder blend in a weight ratio of 1:4 water to powder blend, and stirred for 2 minutes at room temperature to form slurry. The slurry was then poured into 2 inch plastic cube molds and left to cure. The slurry was observed to set into a hard ceramic within 16 minutes. The resulting chemically bonded phospho-silicate ceramic was observed to be dense, non-porous and homogenous. Compression strengths were found to increase from 3300 psi in 1 day to 6500 psi in 21 days.

Experiment Procedure

Each raw material was weighed precisely and added to a metal mixing bowl. The combined materials were then dry mixed for a minimum of 5 minutes using a Kitchen Aide mixer. A precise amount of water was weighed according to the % of raw materials to be mixed. Material temperatures and water temperatures were measured and recorded prior to adding the water. The water was added to the dry materials in the bowl while the mixer was operating at a low speed. After 15 seconds the mixer speed was increased 2 speeds levels until the final mixing time was reached. The slurry was then poured into plastic cube molds and lightly vibrated until filled and leveled. Surface temperatures were taken every minute up to 15 minutes and then every 5 minutes up to 1 hour to determine the level of exothermic reaction. Cube samples were examined for initial setting time and final setting times, which were both recorded. After final setting times were reached, the hardened cubes were removed, labeled and set aside for compression testing using a Forney Compression machine.

Conclusion of Testing

Based on the results of the experiment examples, it has been concluded that a magnesium phosphate cement binder system using magnesium oxide calcined at a temperature of between about 900° F. and about 1800° F. in combination with a metal phosphate and water may result in a very quick setting time (<2 minutes). With the addition of other pozolanic and non-pozzolanic additives and boric acid and cooled water as a retarder, the magnesium phosphate cement binder system may be made to have a longer working time while maintaining reasonable compression strengths. Accordingly, it may be possible to achieve better performing magnesium phosphate cements using higher reactive and low temperature calcined grades of magnesium oxide, and using lower reactive and/or alternative grades of phosphate salts. In some embodiments, the phosphates may be based on pyrophosphates, polyphosphates, and/or phosphonates, such as potassium pyrophosphate. Additionally, it may be possible to provide magnesium phosphate cements utilizing phosphoric acid as a replacement for phosphate salts.

Magnesium phosphate cements utilizing higher reactive, using low temperature calcined magnesium oxide may allow magnesium phosphate cements to be utilized may many new application. Such applications may include, but are not limited to the following example applications.

Pipe linings or coatings. Magnesium phosphate cements consistent with the present disclosure may be applied to the inside or outside of concrete, cast iron or other metal, polymer (plastic), composite type or any other pipes to protect against chemical (acid, sulfides) and moisture attack to the actual pipe or concrete material. The magnesium phosphate cement coatings may be applied either via a dry shotcrete or gunite type spray, or by a liquid brush, spray or other suitable liquefied coating application. The properties of the magnesium phosphate cement coatings on pipes may protect against acids, water, salts, hydrogen sulfide, and/or many other chemicals from causing surface or infused damage to the pipe materials. Such protection may be particularly advantageous when pipes are used for transporting liquid flow through tunnels, waste water treatment plants and collection systems, potable water treatment plants, underground and aboveground transport pipes, refineries and/or vehicular tunnel transport. In some embodiments, the application of magnesium phosphate cement to pipe application may require minimum substrate preparation, may exhibit strong adhesion to a variety of substrates and may be non-shrinking and/or minimally shrinking, and thus may be capable of provide a monolithic crack-free coating. A variety of fibers may be incorporated into the mixes to provide more flexibility in the hardened magnesium phosphate cement. Suitable fibers may include, but are not limited to, polyethylene, polypropylene, nylon, etc.

Concrete Patch and Repair. Magnesium phosphate cement consistent with the present disclosure may provide a suitable alternative solution for current magnesium phosphate cements that are found to set too quickly, evolve ammonia fumes and odors, and/or do not last very long due to loss of adhesion to substrate, or disbondment. As such, in some situations magnesium phosphate cement consistent with the present disclosure may be significantly more durable, have higher bonding strengths while still providing the desired quick setting, provide early high strength properties, and may maintain long term adhesion to substrate. As such, magnesium phosphate cements consistent with the present disclosure may be useful for patching existing concrete or asphalt substrates with minimum preparation.

Structural Concrete for Sewer or Water Management Systems. In addition to tunnels used for waste water or other water transport or treatment, magnesium phosphate cement consistent with the present disclosure may be utilized in applications such concrete boxes, wet wells, manholes, sewers, culverts, digesters, etc. Magnesium phosphate cements consistent with the present disclosure may provide protection against corrosion from acids, hydrogen sulfides, salt and moisture intrusion is critical as well as providing an easy to apply patching material for concrete that has already been damaged by such acid attack. In some situations magnesium phosphate cements consistent with the present disclosure may be used as the actual structural concrete itself, as a surface coating, and/or as a patch or repair product.

Concrete Road, Bridge or Highway Applications. Magnesium phosphate cements consistent with the present disclosure may be utilized to protect the concrete surface, internal steel reinforcing bars and structural integrity from corrosion, heat and mold caused by chemicals, salts and water intrusion. Coatings including magnesium phosphate cements consistent with the present disclosure may also provide fire resistance to concrete structures. Such coatings may be applied, for example, using techniques such as either dry or wet Shotcrete, wet coating applications to the exterior surfaces of columns, girders, bridge decks (topside, underneath and side surfaces), beams and tunnels, and/or using other suitable techniques. In some embodiments, magnesium phosphate cements consistent with the present disclosure may be used in conjunction with glass scrim to increase strength and for repair of concrete structures to substitute for Portland cement based carbon fiber reinforcing systems. Glass scrim typically cannot be used with other cements due to adverse reactions (e.g., Alkali Silica Reactivity—ASR) with the alkalis from the cement. However, glass scrim may be stable for use with magnesium phosphate cements consistent with the present disclosure.

Construction Wall, Floor and Ceiling Boards. In some embodiments, magnesium phosphate cements consistent with the present disclosure may be more water resistant (in some cases significantly more water resistant) than MOC (Magnesium OxyChloride) construction boards, magnesium phosphate cements consistent with the present disclosure may provide improved performance properties as binders in construction board, wallboard or other construction boards. As such, magnesium phosphate cements consistent with the present disclosure may allow for greater control of cure speed by formulating magnesium phosphate cement binder systems utilized appropriate grades of magnesium oxide and phosphate salts, along with controlled water temperatures, use of boric acid and/or with various other sugar based retardants. MOC binder systems may often take over 24 hours to properly set, which may provide for slower production rates. In some embodiments, construction boards and panels utilizing magnesium phosphate cements consistent with the present disclosure may provide initial set-times of seconds to minutes, depending on the production requirements thus allowing for mass production of such boards.

Ballistic panels/walls. Magnesium phosphate cement binders systems consistent with the present disclosure may result in very high compressive strengths and when combined with hard aggregates such as granite, may provide excellent systems that are antiballistic and able to withstand impact from bullets and projectiles in panels or walls. In some embodiments, panels may be made more flexible and thinner incorporating glass, metal nylon mesh that may bind tenaciously to a magnesium phosphate cement matrix consistent with the present disclosure. Walls and panels developed for this use may also be useful in providing blast barriers for critical areas subject to explosions such as airports, embassies, chemical plants and fuel depots.

Airport Concrete Applications. Many airport runways may desirably be repaired in a matter of a few hours, as closing incoming and outgoing plane passages is problematic with the heavy air traffic around the world and may incur heavy revenue losses from landing fees. Therefore, repairs may desirably be conducted in the overnight hours with minimal shutdowns. Magnesium phosphate cements consistent with the present disclosure may provide the required high performance, quick setting and early strength development desirably to meet such requirements more effectively than other concrete repair methods. Further, in some situations, magnesium phosphate cement consistent with the present disclosure may also be useful as a heat shield/barrier on concrete or other material runways used for military landings and takeoffs, or provide full depth landing pads. An example may be the US Forces HOV fighter jet that produces intense heat from the jet engines that can destroy asphalt runways in seconds, and OPC runways within minutes. Accordingly, magnesium phosphate cement consistent with the present disclosure may be formulated to withstand such extremely high temperatures without deterioration and/or damage to surrounding concrete, thus providing safe landing pads for this aircraft.

Concrete Parking Structures, Stadiums, Buildings and other Structural Concrete Applications. Such structures may commonly include steel reinforced structural concretes that may be subjected to the same vigors of chemical and water intrusions as others described hereinabove. As such, in some embodiments, magnesium phosphate cements consistent with the present disclosure may similarly be more durable, stronger and less hazardous than other concrete coating procedures.

Oil and Gas Drilling Concrete/Cement Wells. In some embodiments, properties associated with magnesium phosphate cements consistent with the present disclosure may be particularly suitable for drilling applications where water, oil or gas leakage through cracks may be a major problem and/or concern. Magnesium phosphate cements consistent with the present disclosure may provide relatively low early cure shrinkage properties, therefore, shrinkage cracking may be far less than when Portland Cements are used. Further, magnesium phosphate cements consistent with the present disclosure may be used either as the well-bore cements themselves, and/or as protective coating or as quick-setting repair cements where practical. The ability of the magnesium phosphate cements consistent with the present disclosure to strengthen when absorbing carbon dioxide gasses may be particularly suitable for such an application, as forcing $CO_2$ gasses down well-bore holes may sometimes be used as a way of fracking shale deep into the ground to release oil and natural gas. $CO_2$ gas or carbonation of typical Portland cement structures may often be very deleterious to its structural integrity. However, in some embodiments, the low temperature calcined magnesium oxide utilized in connection with the present disclosure may be highly absorbing of $CO_2$ compared to other magnesium oxide grades. As such, magnesium phosphate cements consistent with the present disclosure may be used to seal off aquifers within oil/gas wells, and thus provide additional protection from unintended contamination of the aquifers and in the wells.

Mining Applications. Concrete support structures of mine shafts and other shotcrete support applications as well as stabilization of walls and ceilings in these shafts are very important for safe utilization of passage ways for miners. Magnesium phosphate cements consistent with the present disclosure may often be further strengthened when absorbing $CO_2$ gasses that may be typically encountered in underground mine, and may be resistant to noxious vapors such as hydrogen sulfide and methane. In addition magnesium phosphate cements consistent with the present disclosure may prevent spreading of fires and often may not deteriorate in case of fire, as may occur with standard Portland cement shotcrete. Accordingly, magnesium phosphate cements consistent with the present disclosure may suffer less fire damage, and may therefore lend itself to a much greater $CO_2$ sink in mines. Also, the experienced relatively quick setting and early strength developing magnesium phosphate cements consistent with the present disclosure may be useful when time to construct or repair is of the essence.

Structural and Non-Structural Walls, Roofing and other support structures for Residential and Commercial Building Construction. As compared to Portland cements, the required thickness of concrete/cement levels for structures utilizing magnesium phosphate cements consistent with the present disclosure may be significantly lower, and thus lighter in weight. Also, due to the comparatively very high compressive and tensile strength of magnesium phosphate cements consistent with the present disclosure (e.g., as compared to ordinary Portland cement), the use of heavy steel or composite reinforcing bars can be significantly reduced or eliminated when using magnesium phosphate cements consistent with the present disclosure. Further, the low temperature calcined magnesium oxide utilized in connection with the present disclosure may be capable of providing a stronger cement matrix compared to conventional magnesium phosphate cements, which may enables the engineer, architect or contractor to use lighter weight fillers while still maintaining required strength to the walls or support structures. The use of fiberglass mesh or scrim materials may provide even further reinforcement to walls utilizing magnesium phosphate cements consistent with the present disclosure, thereby providing improved impact resistance from flying debris encountered from hurricane force winds. Magnesium phosphate cements consistent with the present disclosure may also be applied using dry shotcrete and gunite spray applications, by wet application of layers via placements into molds, or other related concrete placement techniques.

Concrete Blocks, Bricks and Tiles. As a result of the increased strength development resulting from using low temperature calcined, higher reactive magnesium oxide, magnesium phosphate cements consistent with the present disclosure may be used to replace Portland cement for manufacturing concrete blocks (lightweight, split or bold faced, etc.), concrete bricks and concrete tiles (including tactile warning tiles, ceramic tiles and glass tiles). Further, relatively fast setting magnesium phosphate cement-based mortars and grouts consistent with the present disclosure may be used as a binder for masonry units (block, brick or tile). A coating of magnesium phosphate cement consistent with the present disclosure applied to Portland cement based blocks or other masonry units may also be useful to provide mildew, moisture and chemical resistance. Additionally, magnesium phosphate cement consistent with the present disclosure may be used as an additive to compressed soil blocks to add strength to the block and improve waterproofing. Further, a spray coating including magnesium phosphate cement consistent with the present disclosure may be added to such blocks to improve waterproofing, etc.

Heavy Metal Treatment. Precipitated heavy metal hydroxide sludges and dry solids can be encapsulated with magnesium phosphate cements consistent with the present disclosure to prevent leaching of the metals upon landfill disposal.

Exterior and Interior Roof Coatings and Panels. In some embodiments, the relatively higher strength and earlier strength development properties of magnesium phosphate cements consistent with the present disclosure may make such magnesium phosphate cements well suited for use on roofing materials, including, for example, on Styrofoam insulating panels. Such a coating may provide water, mildew, fire, bacteria and algal, wear, abrasion and impact resistance to the roof while helping maintain proper insulation properties and chemical resistance.

Line Marking Coatings/Paints. As a result of possible abrasion resistance, fast setting times, and the ability to adhere tenaciously to other cementitious, asphalt-based, wood or polymer substrates, magnesium phosphate cements consistent with the present disclosure may provide an advantageous substrate for line marking and safety coatings. A wide variety of pigments can be incorporated in these coatings/paints to provide the desired safety colors. Incorporation of phosphorescent pigments into magnesium phosphate cements consistent with the present disclosure may allow the paint/coating to absorb light from the sun or incandescent lighting and subsequently emitting phosphorescent light when darkness occurs, thereby providing visible markings on roads and bridges for increased safety, and clearly marking escape routes in manufacturing facilities, warehouses, etc. Coatings/paints based on magnesium phosphate cements consistent with the present disclosure may be applied on the surface of a desired substrate and/or can be embedded in a pre-recessed channel curing flush to the surface. Reflective glass beads may also be incorporated on the surface to provide retro-reflectivity during difficult driving conditions further enhancing their value for safety.

Consistent with various embodiments, magnesium phosphate cements consistent with the present disclosure may provide a desirably fast setting time for various applications, such as concrete patch and repair of concrete roads, bridge decks and/or aircrafts runways where it may be highly desirably to complete the repair and allow the structure to re-open traffic within as short a time as 45 minutes. Further, magnesium phosphate cements consistent with the present disclosure may also provide various additional/alternative possible benefits, including, but not limited to, fire resistance and/or non-combustibility; mold, bacteria, and insect resistance; tenacious bonding strengths to a wide ranging choice of materials; high early and ultimate compression and tensile strengths; low shrinkage and/or minimal shrinkage cracking; water resistance; acid, sulfide, alkali, and chemical resistance; low electrical conductivity; improved thermal conductivity; oil, grease, and solvent resistance; abrasion and/or wear resistance, impact, indentation, and scratch resistance; resistance to most chemicals; ability to incorporate a wide variety of recycled materials, including glass, wood fibers, etc.; lightweight, resilient, minimal alkali silica reaction issues; greener/sustainable technology with less fossil fuel consumption associated with magnesium oxide preparation due to lower calcining temperatures; the ability to absorb carbon dioxide over time; and the ability to incorporate a wide range of recycled materials in the cement matrix.

A number of implementations have been described. Nevertheless, it will be understood that various modifications may be made. Accordingly, other implementations are within the scope of the following claims.

What is claimed is:

1. A magnesium phosphate cement composition comprising:
    magnesium oxide calcined to exhibit a caustic magnesia activity neutralization time of between about 9 second to about 30 seconds using a 1.0N acetic acid and a magnesium oxide content of between about 10% to about 100%, wherein the calcined magnesium oxide includes a surface area in the range of between about 10 $m^2/g$ to about 120 $m^2/g$; and
    a phosphate material.

2. The magnesium phosphate cement composition of claim 1, wherein the magnesium oxide is calcined using a multiple hearth furnace.

3. The magnesium phosphate cement composition of claim 2, wherein the multiple hearth furnace includes a Herreshoff multiple hearth furnace.

4. The magnesium phosphate cement composition of claim 1, wherein the magnesium oxide and the phosphate material are provided having a magnesium oxide to phosphate material weight ratio of between about 1:5 to about 5:1.

5. The magnesium phosphate cement composition of claim 1, wherein the magnesium oxide includes a surface treatment adsorbed on surfaces of the magnesium oxide to increase the time for the composition to reach a maximum heat of hydration in response to hydrating the composition.

6. The magnesium phosphate cement composition of claim 5, wherein the surface treatment includes a surfactant.

7. The magnesium phosphate cement composition of claim 1, further including:
    a cure retardant including one or more of zinc oxide, lithium citrate, lithium acetate, lignosulfonates, zeolites, polysaccharides, amino acids, tetraborates, and organic acid salts.

8. The magnesium phosphate cement composition of claim 1, wherein the phosphate material includes an inorganic phosphate salt.

9. The magnesium phosphate cement composition of claim 8, wherein the phosphate material includes a monopotassium phosphate.

10. The magnesium phosphate cement composition of claim 1, further including a powdered carbonate.

11. The magnesium phosphate cement composition of claim 5, wherein the surface treatment includes one or more of a hydrocarbon oil, a hydrocarbon wax, an organic glycol, a siliconized oil, a siliconized wax, a siliconized glycol, a fluorinated fluid, a monomer, an oligomer, a polymer, a reactive silane coupling agent, a fatty acid, a fatty acid ester, a polysaccharide, a long chain alkyl silicone monomer, a time releasing water soluble polymer, a time releasing water soluble oligomer, a gelatin, an acetate, and a borate.

12. The magnesium phosphate cement composition of claim 1, wherein the phosphate material includes one or more of an organic phosphate salt and an inorganic phosphate salt.

13. The magnesium phosphate cement of composition claim 12, wherein the phosphate material includes one or more of a dihydrogen phosphate, a phosphonate, polyphosphate, pyrophosphate, a phosphoric acid, and an orthophosphate.

* * * * *